United States Patent
Kane

(10) Patent No.: US 8,595,829 B1
(45) Date of Patent: Nov. 26, 2013

(54) SYSTEMS AND METHODS FOR AUTOMATICALLY BLACKLISTING AN INTERNET DOMAIN BASED ON THE ACTIVITIES OF AN APPLICATION

(75) Inventor: David Kane, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 892 days.

(21) Appl. No.: 12/432,923

(22) Filed: Apr. 30, 2009

(51) Int. Cl.
*G06F 12/14* (2006.01)

(52) U.S. Cl.
USPC ............... 726/22; 726/23; 726/24; 726/25

(58) Field of Classification Search
USPC .......................... 726/22, 23, 24, 25
See application file for complete search history.

(56) References Cited

U.S. PATENT DOCUMENTS

| 7,159,149 | B2* | 1/2007 | Spiegel et al. | 714/43 |
| 7,743,418 | B2* | 6/2010 | Clift et al. | 726/24 |
| 7,779,472 | B1* | 8/2010 | Lou | 726/24 |
| 8,079,085 | B1* | 12/2011 | Wu et al. | 726/24 |
| 2003/0149887 | A1* | 8/2003 | Yadav | 713/200 |
| 2006/0075494 | A1* | 4/2006 | Bertman et al. | 726/22 |
| 2007/0094725 | A1* | 4/2007 | Borders | 726/22 |
| 2008/0127338 | A1* | 5/2008 | Cho et al. | 726/22 |
| 2008/0295169 | A1* | 11/2008 | Crume | 726/22 |
| 2009/0100517 | A1* | 4/2009 | Kim et al. | 726/22 |
| 2009/0113548 | A1* | 4/2009 | Gray et al. | 726/24 |

* cited by examiner

*Primary Examiner* — Kaveh Abrishamkar
(74) *Attorney, Agent, or Firm* — Holland & Hart LLP

(57) ABSTRACT

A computer-implemented method for automatically adding an Internet domain to a blacklist based on monitored activities of an application is described. An application running on a client computing device is analyzed to determine whether the application is a malware application. The execution of the application is terminated when the application connects to an Internet domain. The Internet domain is added to a blacklist. A notification is transmitted that indicates the Internet domain is blacklisted.

17 Claims, 7 Drawing Sheets

SYSTEMS AND METHODS FOR AUTOMATICALLY BLACKLISTING AN INTERNET DOMAIN BASED ON THE ACTIVITIES OF AN APPLICATION

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors.

One or more computer systems may be managed by a server. In some instances, a host computer software program may run on a computer system that is managed by the server. The host program may interact with external network connections. For example, the program may interact with the Internet. In some instances, a program may be a malware application that performs malicious activity on the host computer system. Malware may be software that is designed to infiltrate or damage the computer system. Examples of malware may include computer viruses, worms, trojan horses, spyware, and other malicious and unwanted software.

Some of these malware applications connect to a random Internet site to receive instructions and/or download a malicious payload to execute on the host computing device. Currently, prevention systems wait until the malicious payload is downloaded by the malware application and executed on the host device before reacting. Blacklists are currently used to list websites that host malicious files and payload for malware. However, because the malware connects to a random website, it is virtually impossible to block the correct website before the malware connects to the domain to download the malicious payload. As a result, current prevention systems do not block the website until the payload has been downloaded by at least one computing device that hosts the malware application. As such, benefits may be realized by improved systems and methods for automatically blacklisting an Internet domain based on monitored activities of an application.

SUMMARY

According to at least one embodiment, a computer-implemented method for automatically adding an Internet domain to a blacklist based on monitored activities of an application is described. An application running on a client computing device may be analyzed to determine whether the application is a malware application. The execution of the application may be terminated when the application connects to an Internet domain. The Internet domain may be added to a blacklist. A notification may be transmitted that indicates the Internet domain is blacklisted.

In one embodiment, the activity of the application may be monitored based on the analysis. The notification may include instructions to avoid connecting to the Internet domain. In one configuration, the notification may be transmitted to a plurality of client computing devices.

In one example, the application may be uninstalled from the client computing device. The application may connect to the Internet domain to download a malicious payload. In one embodiment, the application running on a virtual client computing device may be monitored. The execution of the application may be terminated when an author of the application successfully registers an Internet domain. In one example, the Internet domain may be a uniform resource locator (URL) address.

A computer system configured to automatically add an Internet domain to a blacklist based on monitored activities of an application is also described. The computer system may include a processor and memory in electronic communication with the processor. The computer system may also include an intrusion prevention system. The intrusion prevention system may include an analyzing module configured to analyze an application running on a client computing device to determine whether the application is a malware application. The prevention system may also include an application termination module configured to terminate the execution of the application when the application connects to an Internet domain. In addition the prevention system may include a monitoring module configured to add the Internet domain to a blacklist, and a notification module configured to transmit a notification that indicates the Internet domain is blacklisted.

A computer-program product for automatically adding an Internet domain to a blacklist based on monitored activities of an application is also described. The computer-program product may include a computer-readable medium having instructions thereon. The instructions may include code programmed to analyze an application running on a client computing device to determine whether the application is a malware application. The instructions may also include code programmed to terminate the execution of the application when the application connects to an Internet domain. In addition, the instructions may include code programmed to add the Internet domain to a blacklist. Further, the instructions may include code programmed to transmit a notification that indicates the Internet domain is blacklisted.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
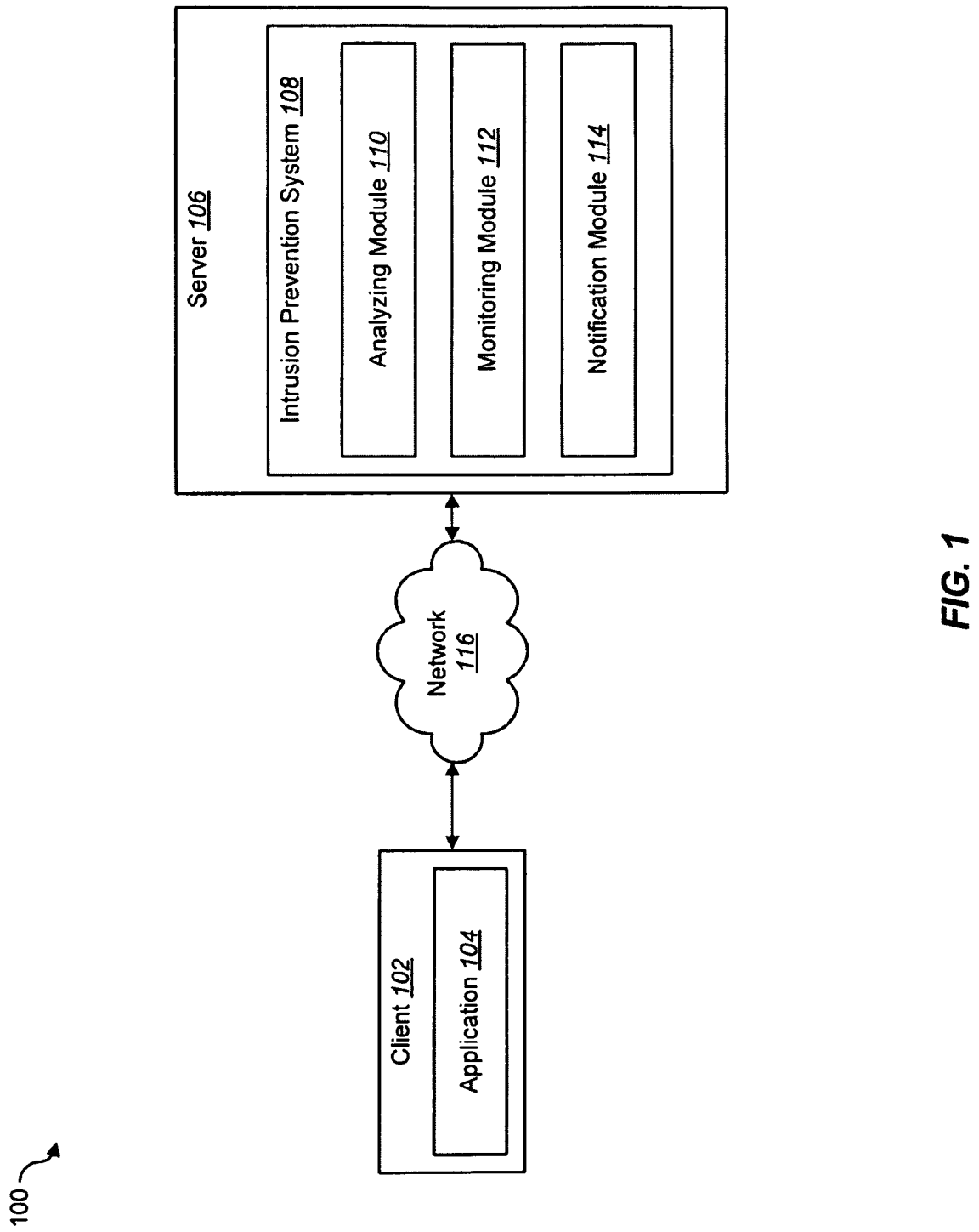
FIG. 1 is a block diagram illustrating one embodiment of a client communicating with a server over a network.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

In one embodiment, malware applications may use randomly-named (or currently unregistered) Internet domains to distribute their payload. For example, a malware application may be installed on a computing device and then connect to an Internet domain in order to download a malicious payload. The malicious payload may then be released to cause harm to the computing device hosting the malware application. In addition, computing devices connected to the host device may also be infected with the malicious payload.

Static domain blacklists may be created that include a list of Internet domains that host malicious payloads for malware applications. Currently, however, an Internet domain is added to a blacklist after a malware application has successfully downloaded and executed the malicious payload. Current methods are unable to identify which random Internet domains will be used by a malware application to retrieve the malicious payload before the payload is actually downloaded and executed. In other words, a static domain blacklist cannot preemptively block applications from connecting to the Internet domain that hosts the malicious payload, even when a potential threat is known. In one embodiment, once a random Internet domain is selected by the malware application and/or registered by the author of the malware application, it is critically important to block that domain for the local host of the application as well as for other nodes in a protection network. Current solutions only react once the malware application begins executing the downloaded payload.

FIG. 1 is a block diagram 100 illustrating one embodiment of a client 102 communicating with a server 106 over a network 116. The network 116 may be a wide area network (WAN), a local area network (LAN), and the like. The client 102 and the server 106 may be computing devices, such as, but not limited to, a personal computer (PC), a laptop, a personal digital assistant (PDA), a mobile device, etc.

In one embodiment, the client 102 may include an application 104. The application 104 may be a software-based application that is installed and executed on the client 102. The server 106 may include an intrusion prevention system 108 that may prevent the application 104 from downloading and executing a malicious payload that may cause harm to the client 102. The prevention system 108 may include an analyzing module 110 that may analyze certain characteristics of the application 104. In one configuration, the analyzing module 110 may determine whether the application 104 is a malware application (or has the potential to be a malware application). The prevention system 108 may also include a monitoring module 112 that may monitor certain activities of the application 104. For example, the monitoring module 112 may monitor certain download and execution activities of the application to determine when the application attempts to download and/or execute a malicious payload. In one embodiment, the prevention system 108 may also include a notification module 114 that may notify the client 102 (and additional clients connected to the server 106) that the application 104 has attempted to download a malicious payload. The notification module 114 may notify the client 102 (and additional clients) the location where the application 104 attempted to download the malicious payload. The notification may warn other clients to avoid this location.

Figure 2:
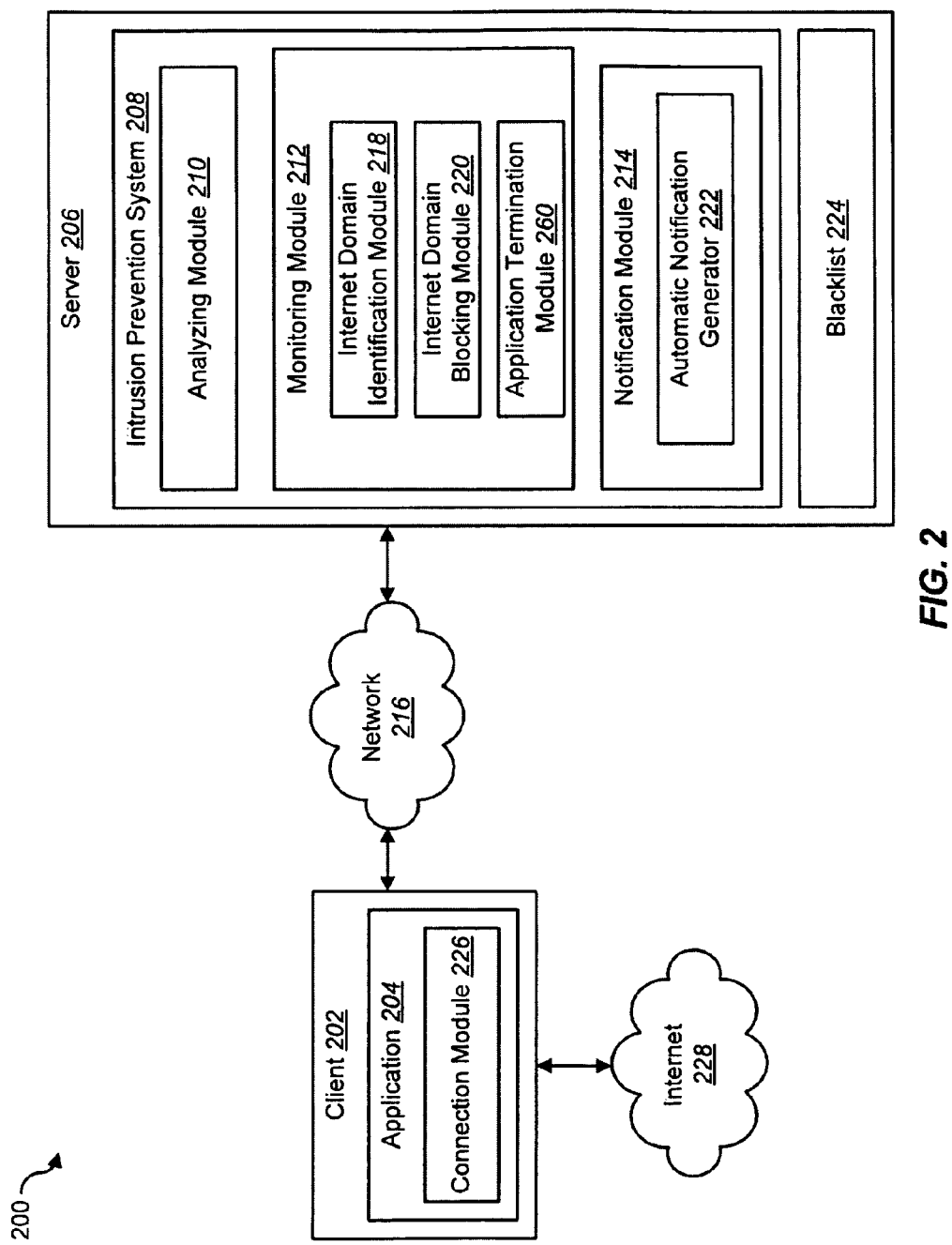
FIG. 2 is a block diagram illustrating another embodiment of a client communicating with a server over a network.

FIG. 2 is a block diagram 200 illustrating another embodiment of a client 202 communicating with a server 206 over a network 216. The client 202 may include an application 204 that is installed and running on the client 202. In one configuration, the application 204 may include a connection module 226. The connection module 226 may connect the application to a global network, such as an Internet network 228. The Internet 228 may include a multitude of domains (or addresses). The connection module 226 may connect to one of these domains in order to receive a payload for the application 204 to execute. In another embodiment, the connection module 226 may connect to an Internet domain in order for the application 204 to receive further instructions on where to receive the payload.

The server 206 may include an intrusion prevention system 208 as previously explained. The system 208 may include an analyzing module 210 that may analyze the application 204 to determine whether the application 204 is a malware application. In addition the system 208 may include a monitoring module 212 that may monitor certain activities of the application 204, as explained above. In one configuration, the monitoring module 212 may include an Internet domain identification module 218. The identification module 218 may identify a particular Internet domain connected to the application 204 via the connection module 226. For example, the identification module 218 may identify the uniform resource locator (URL) associated with the Internet domain. In one embodiment, the monitoring module 212 may further include an application termination module 260. The termination module 260 may terminate the execution of the application 204 when a connection to an Internet domain is detected. The application 204 may shut down and the connection with the Internet domain may also be terminated.

In one example, the monitoring module 212 may also include an Internet domain blocking module 220 that may block the Internet domain identified by the identification module 218. For example, the blocking module 220 may add the identified domain to a blacklist 224 maintained by the server 206. The blacklist 224 may include a list of Internet domains that may host malicious payloads.

The intrusion prevention system 208 may also include a notification module 214. In one embodiment, an automatic notification generator 222 may generate an automatic notification to be sent to each client (such as the client 202) in communication with the server 206. The notification may include instructions to avoid the Internet domain identified by the Internet domain identification module 218. The notification may also indicate that this Internet domain has been added to the blacklist 224. In other words, the automatic notification generator 222 may generate a notification that warns administrators of clients connected to the server 206 to avoid connecting to a particular Internet domain, because the domain may be hosting malicious files.

Figure 3:
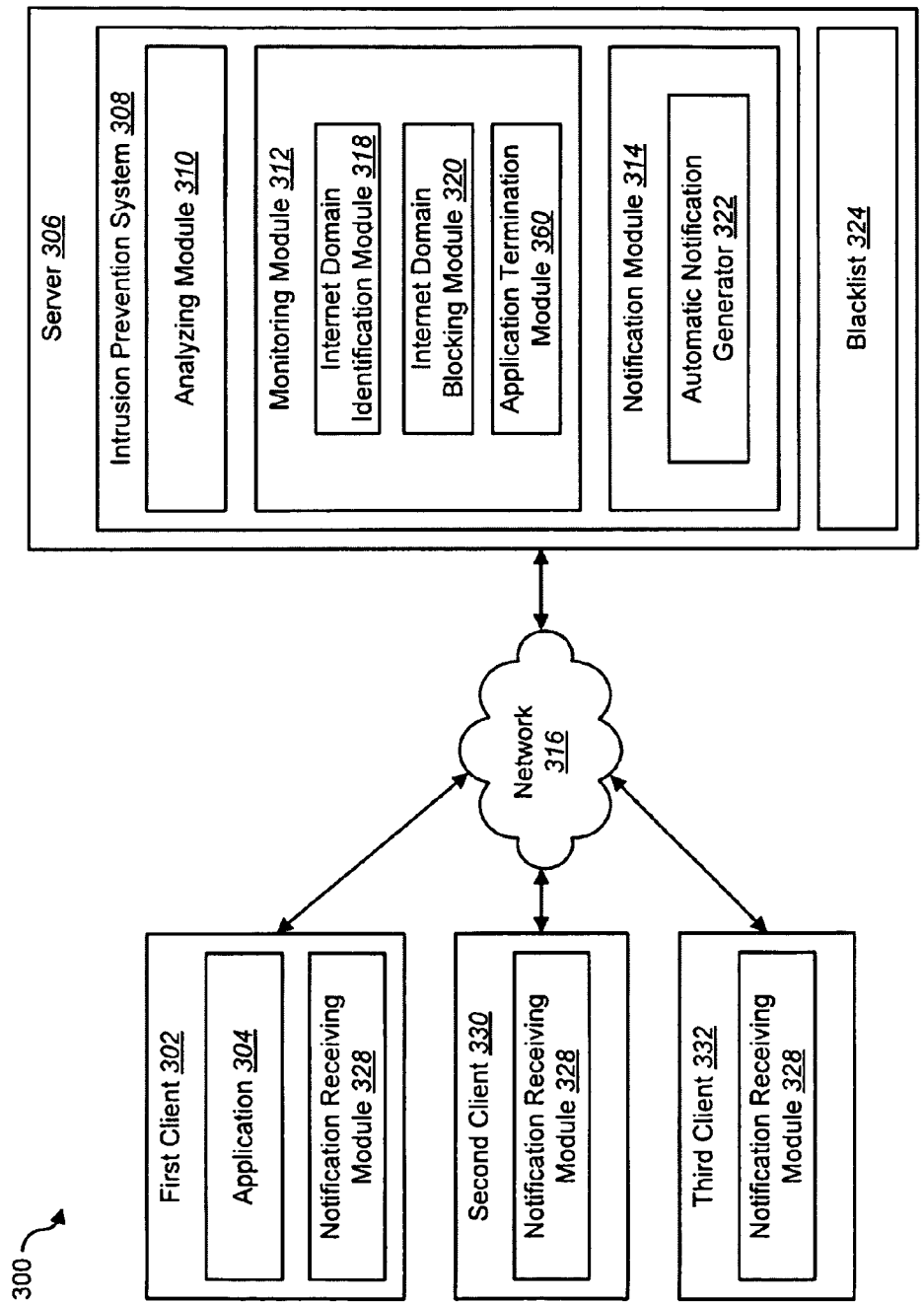
FIG. 3 is a block diagram illustrating one embodiment of multiple clients communicating with a server over a network.

FIG. 3 is a block diagram 300 illustrating one embodiment of multiple clients 302, 330, 332 communicating with a server 306 over a network 316. In one configuration, a first client 302 includes an application 304. As previously explained, an intrusion prevention system 308 on the server 306 may determine whether the application 304 is a malware application. In addition, the system 308 may monitor activities of the application 304 and notify clients 302, 330, 332 about these activities. For example, a monitoring module 312 may monitor the application 304 and determine when the application 304 connects to an Internet domain. This particular domain may be added to a blacklist 324 and the application 304 may be terminated. When the Internet domain is added to the blacklist 324, an automatic notification generator 322 may generate a notification that is transmitted to each client 302, 330, 332 connected to the server 306. This notification may include the address of the Internet domain with a warning to avoid connecting to this domain. Each client 302, 330, 332 may include a notification receiving module 328 in order to receive an interpret the notification. While only three clients 302, 330, 332 are illustrated, it is to be understood that the server 306 may be communicating with more or less then three clients.

Figure 4:
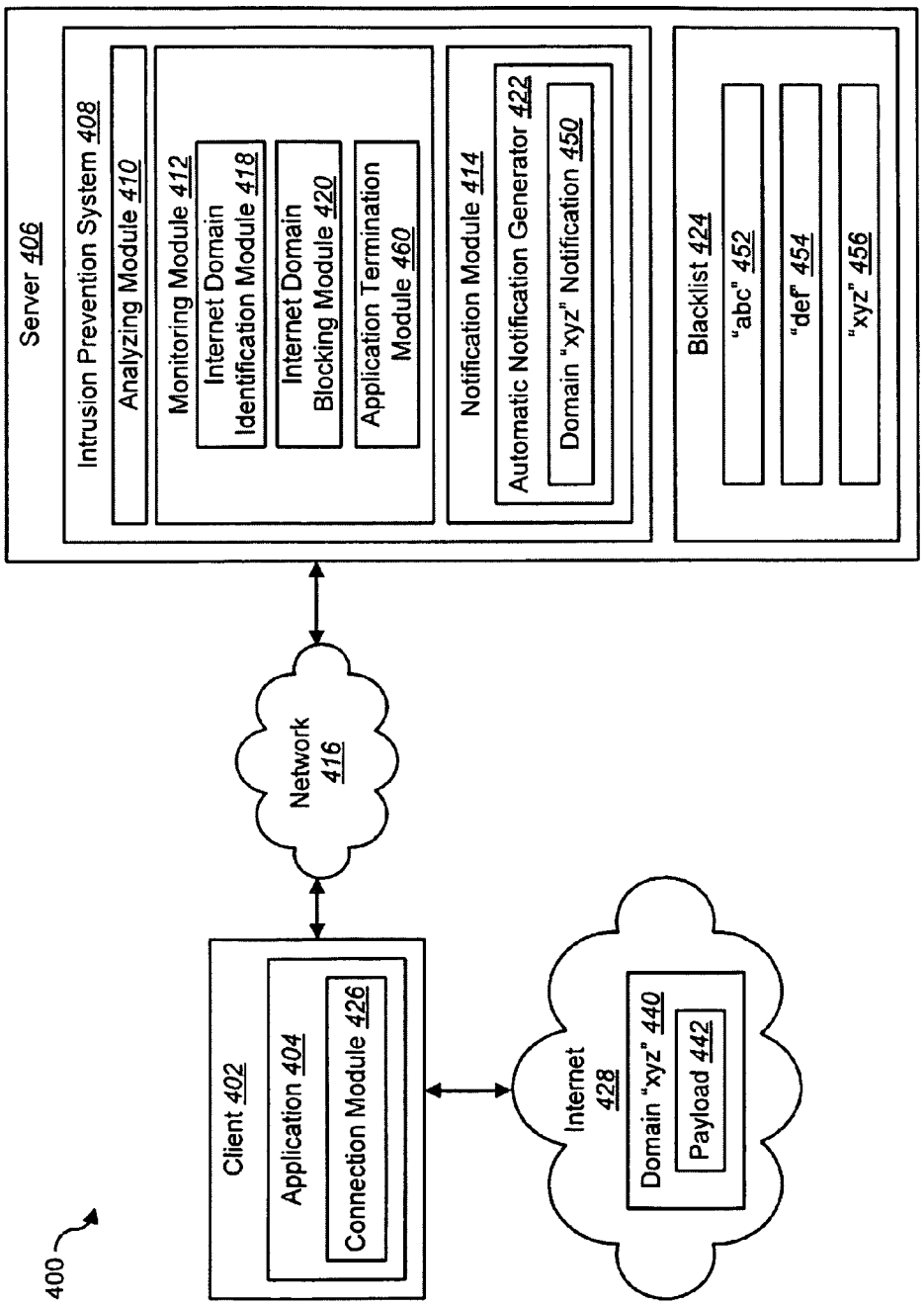
FIG. 4 is a block diagram illustrating a further embodiment of a client communicating with a server over a network.

FIG. 4 is a block diagram 400 illustrating a further embodiment of a client 402 communicating with a server 406 over a network 416. As previously explained, the client 402 may include an application 404 that is installed and running on the client 402. The server 406 may include an intrusion prevention system 408 that may monitor the activities of the application 404. In one example, an analyzing module 410 may analyze the application 404 in order to determine whether the application 404 is a malware (or malicious) application. A monitoring module 412 may monitor certain activities taken by the application 404. For example, the application 404 may connect to a domain "xyz" 440 through an Internet network 428. The application 404 may connect to the domain 440 via a connection module 426. In one embodiment, the application 404 may connect to the domain "xyz" 440 in order to download a malicious payload 442 hosted at the domain 440. Upon connecting to the domain 440, an Internet domain identification module 418 may identify the domain "xyz" 440 and an application termination module 460 may terminate the execution of the application 404. In a further embodiment, the termination module 460 may also remove the application 404 from the client 402. In other words, the termination module 460 may uninstall the application 404 from the client 402.

In one configuration, an Internet domain blocking module 420 may add the domain "xyz" 440 to a blacklist 424. The blacklist 424 may include a list of Internet domains that may host malicious files. For example, the blacklist 424 may include a domain address "abc" 452, a domain address "def" 454, and now the domain address "xyz" 456. A notification module 414 may include an automatic notification generator 422 that may generate a notification to send to each client connected to the server 406. In this example, the generator 422 may generate a domain "xyz" notification 450 to warn clients to avoid connecting to the Internet domain "xyz" 440.

Figure 5:
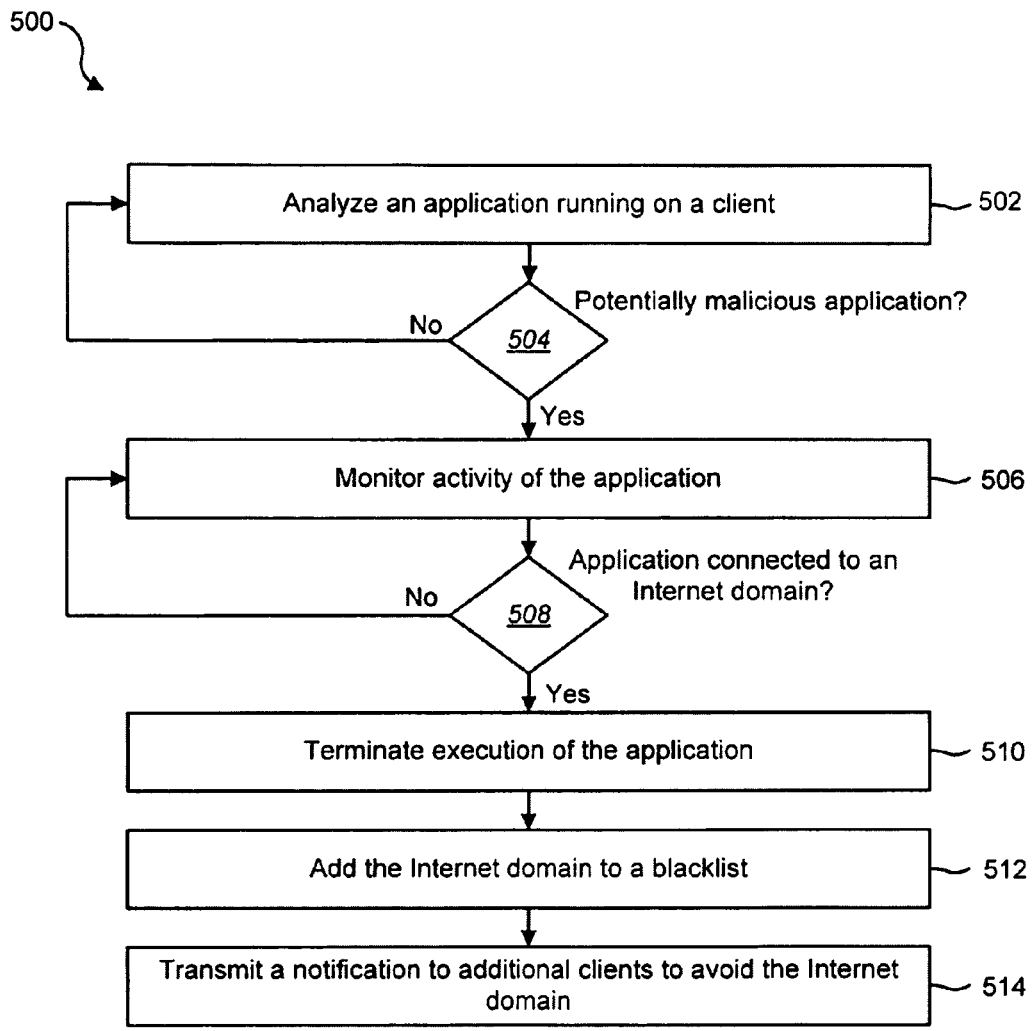
FIG. 5 is a flow diagram illustrating one embodiment of a method for automatically blacklisting an Internet domain based on suspicious activity of an application.

FIG. 5 is a flow diagram illustrating one embodiment of a method 500 for automatically blacklisting an Internet domain based on suspicious activity of an application. In one embodiment, the method 500 may be implemented by the server 106. For example, the method 500 may be implemented by the intrusion prevention system 108 running on the server 106.

In one embodiment, an application running on a client may be analyzed 502. For example, the application may be analyzed to determine 504 whether the application is a potentially malicious application. In other words, the application may be analyzed 502 to determine 504 whether the application is a malware application. If the application is determined 504 to not be a malicious application, the method 500 may continue to analyze 502 an application running on a client. If, however, it is determined 504 that the application is a potentially malicious application, the activity of the application may be monitored 506. For example, attempts by the application to connect to an Internet domain may be monitored 506. In one configuration, a determination 508 may be made as to whether the application has successfully connected to an Internet domain. If it is determined 508 that the application has not connected to a domain, the method 500 may return to continue monitoring 506 the activity of the application.

In one example, if it is determined 508 that the application has successfully connected to an Internet domain, execution of the application may be terminated 510. In a further embodiment, the application may be uninstalled from the host client device. The Internet domain may be added 512 to a blacklist and a notification may be transmitted 514 to additional clients. The notification may instruct the additional clients to avoid connecting to the Internet domain.

As illustrated by the method 500, a currently-benign threat (i.e., the application) may be observed until it successfully connects to an Internet domain. Once the application connects to the domain, the application may be shut down and the domain may be blacklisted. In one embodiment, rather than allowing a potentially-malicious application to be running on a client device until it connects to an Internet domain, the present systems and methods may be applied to a virtual-type environment. In other words, the application may run and be monitored within this virtual environment.

Figure 6:
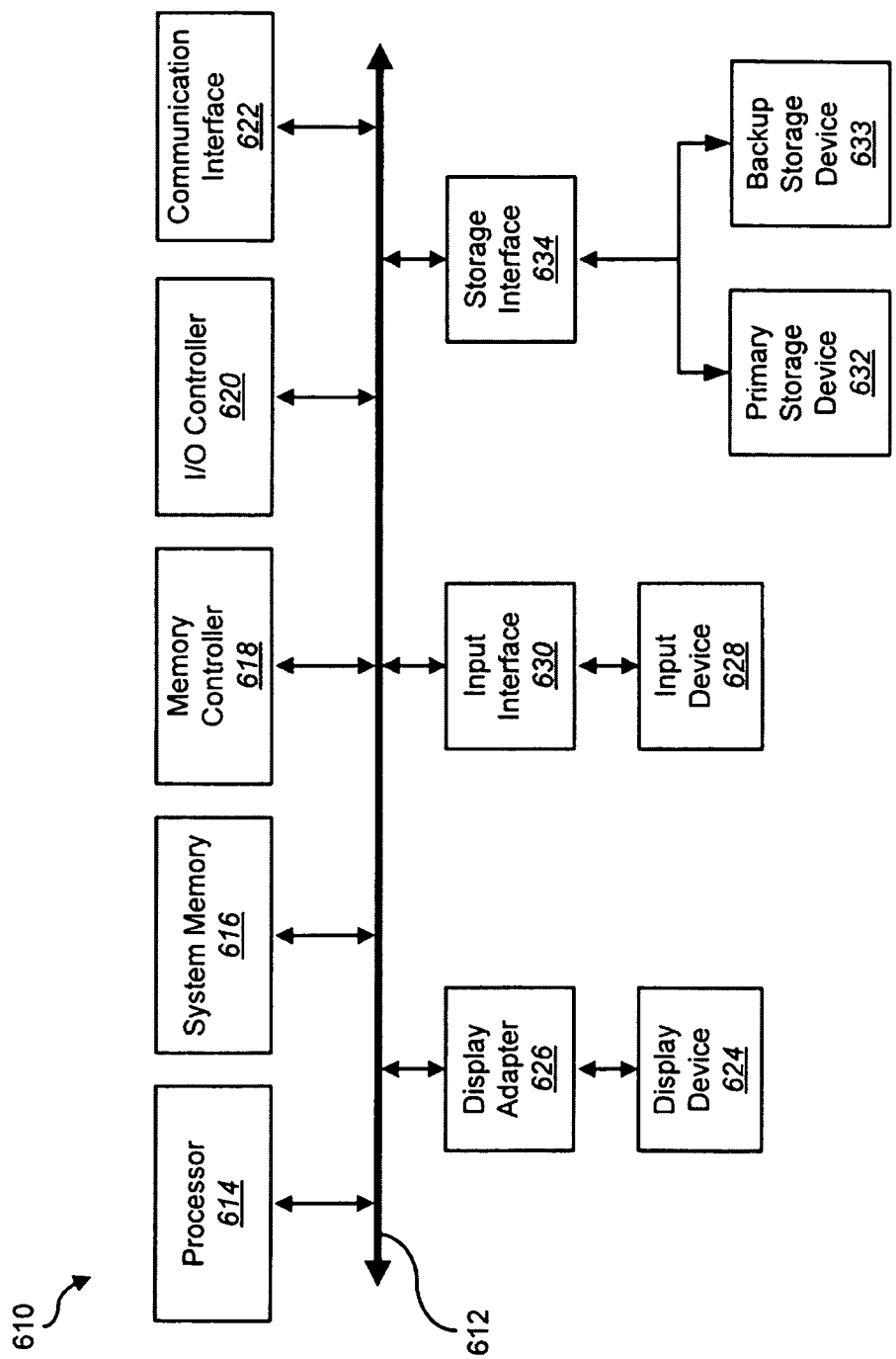
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the analyzing, terminating, adding, and transmitting steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as analyzing, terminating, adding, and transmitting.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for analyzing, terminating, adding, and transmitting steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the analyzing, terminating, adding, and transmitting steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the analyzing, terminating, adding, and transmitting steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Storage devices 632 and 633 may also be used, for example, to perform and/or be a means for performing, either alone or in combination with other elements, one or more of the analyzing, terminating, adding, and transmitting steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
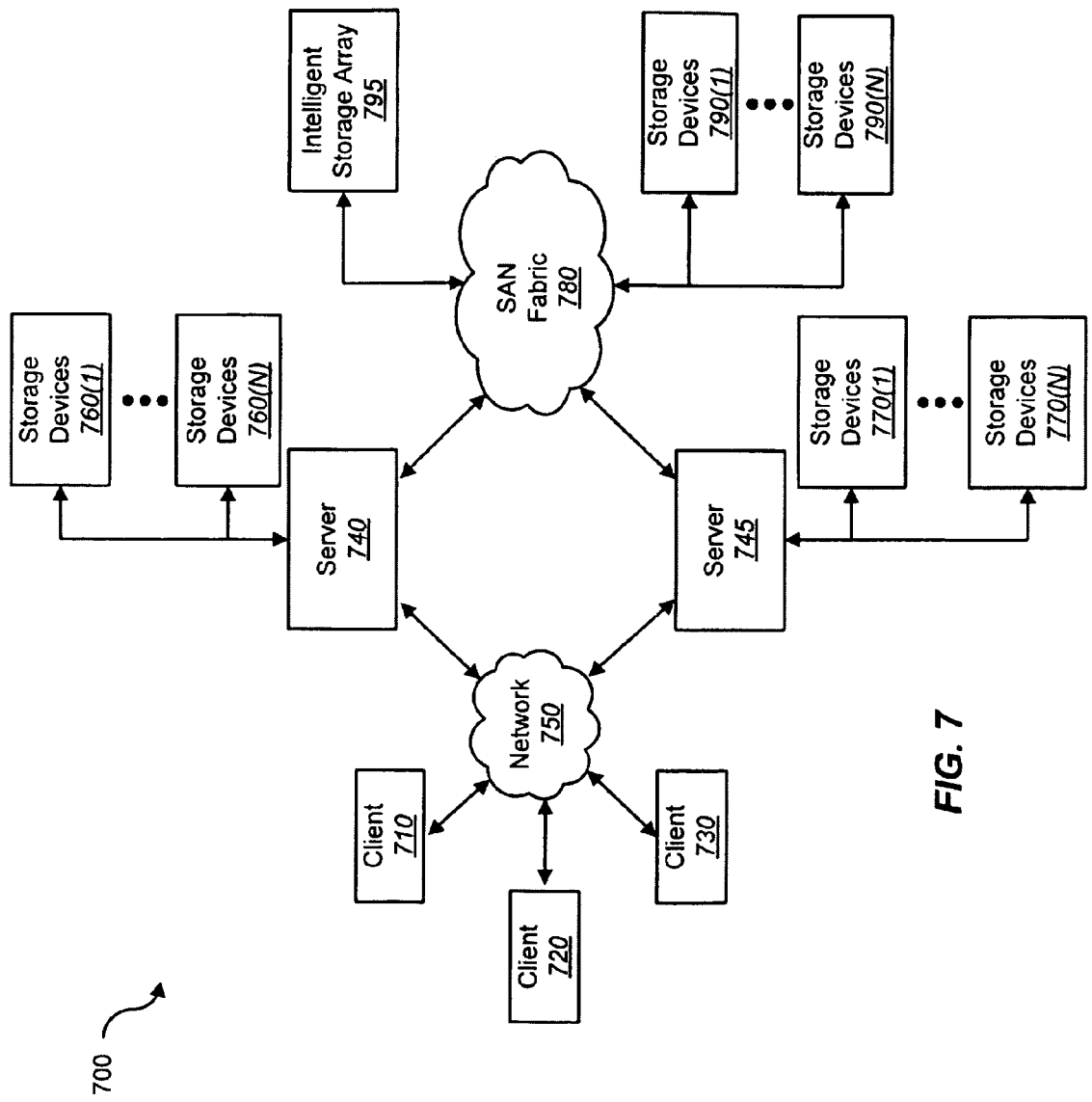
FIG. 7 is a block diagram of an exemplary network architecture in which client systems and servers may be coupled to a network.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or to run certain software applications. Network 750 generally represents any telecommunication or computer network; including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the analyzing, terminating, adding, and transmitting steps disclosed herein. Network architecture 700 may also be used to perform and/or be a means for performing other steps and features set forth in the instant disclosure.

As detailed above, computing system 610 and/or one or more of the components of network architecture 700 may perform and/or be a means for performing, either alone or in combination with other elements, one or more steps of the exemplary methods described and/or illustrated herein. For example, computing system 610 and/or one or more of the components of network architecture 700 may perform and/or be a means for performing a computer-implemented method for automatically adding an Internet domain to a blacklist based on monitored activities of an application that may comprise: 1) analyzing an application running on a client computing device to determine whether the application is a malware application, 2) terminating the execution of the application when the application connects to an Internet domain, 3) adding the Internet domain to a blacklist, and then 4) transmitting a notification that indicates the Internet domain is blacklisted.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for automatically adding an Internet domain to a blacklist based on monitored activities of an application, comprising:
    analyzing an application running on a client computing device to determine whether the application is a malware application;
    upon determining that the application is a malware application, monitoring the application for an attempt to connect to an Internet domain;
    determining whether the attempt to connect to the Internet domain results in a successful connection to the Internet domain;
    upon detecting that the successful connection to the Internet domain has been made, terminating the execution of the application;
    adding the Internet domain to a blacklist; and
    transmitting a notification that indicates the Internet domain is blacklisted.

2. The method of claim 1, wherein the notification comprises instructions to avoid connecting to the Internet domain.

3. The method of claim 1, further comprising transmitting the notification to a plurality of client computing devices.

4. The method of claim 1, further comprising uninstalling the application from the client computing device.

5. The method of claim 1, wherein the application connects to the Internet domain to download a malicious payload.

6. The method of claim 1, further comprising monitoring the application running on a virtual client computing device.

7. The method of claim 1, further comprising terminating the execution of the application when an author of the application successfully registers an Internet domain.

8. The method of claim 1, wherein the Internet domain comprises a uniform resource locator (URL) address.

9. A computer system configured to automatically add an Internet domain to a blacklist based on monitored activities of an application, comprising:
    a processor;
    memory in electronic communication with the processor, the memory storing computer executable instructions that when executed by the processor cause the processor to:
        analyze an application running on a client computing device to determine whether the application is a malware application;
        upon determining that the application is a malware application, monitor the application for an attempt to connect to an Internet domain;
        determine whether the attempt to connect to the Internet domain results in a successful connection to the Internet domain;
        upon detecting that the successful connection to the Internet domain has been made, terminate the execution of the application;
        add the Internet domain to a blacklist; and
        transmit a notification that indicates the Internet domain is blacklisted.

10. The computer system of claim 9, wherein the notification comprises instructions to avoid connecting to the Internet domain.

11. The computer system of claim 9, wherein the processor is further configured to transmit the notification to a plurality of client computing devices.

12. The computer system of claim 9, wherein the processor is further configured to uninstall the application from the client computing device.

13. The computer system of claim 9, wherein the application connects to the Internet domain to download a malicious payload.

14. The computer system of claim 9, wherein the processor is further configured to monitor the application running on a virtual client computing device.

15. The computer system of claim 9, wherein the processor is further configured to terminate the execution of the application when an author of the application successfully registers an Internet domain.

16. The computer system of claim 9, wherein the Internet domain comprises a uniform resource locator (URL) address.

17. A computer-readable storage device storing instructions that when executed by a processor cause the processor to:
    analyze an application running on a client computing device to determine whether the application is a malware application;
    upon determining that the application is a malware application, monitor the application for an attempt to connect to an Internet domain;
    determine whether the attempt to connect to the Internet domain results in a successful connection to the Internet domain;
    upon detecting that the successful connection to the Internet domain has been made, terminate the execution of the application;
    add the Internet domain to a blacklist; and transmit a notification that indicates the Internet domain is blacklisted.

* * * * *